United States Patent
Billgren

(10) Patent No.: US 6,564,689 B1
(45) Date of Patent: May 20, 2003

(54) BLANK FOR GUN BARREL, METHOD FOR PRODUCING SAID GUN BARREL AND GUN BARREL

(75) Inventor: Per Billgren, Söderfors (SE)

(73) Assignee: Damasteel Aktiebolag, Soderfors (SE)

( * ) Notice: Subject to any disclaimer, the term of this patent is extended or adjusted under 35 U.S.C. 154(b) by 0 days.

(21) Appl. No.: 09/913,976

(22) PCT Filed: Feb. 2, 2000

(86) PCT No.: PCT/SE00/00196
§ 371 (c)(1),
(2), (4) Date: Aug. 21, 2001

(87) PCT Pub. No.: WO00/58043

PCT Pub. Date: Oct. 5, 2000

(30) Foreign Application Priority Data

Mar. 15, 1999 (SE) .............................. 9900905

(51) Int. Cl.[7] .................... F41A 21/02; F41A 21/20; C21D 8/10; B22F 3/17; B22F 5/12

(52) U.S. Cl. ................ 89/16; 89/14.5; 419/6; 419/28; 419/29; 419/55; 148/519; 148/593

(58) Field of Search ............... 89/16, 14.05; 428/547, 428/546, 577, 683, 685; 419/6, 55, 28, 29; 148/519, 648, 593

(56) References Cited

U.S. PATENT DOCUMENTS

| | | | | |
|---|---|---|---|---|
| 2,258,563 A | * | 10/1941 | Armstrong et al. | 138/142 |
| 2,717,846 A | * | 9/1955 | Harvey | 148/632 |
| 3,573,900 A | * | 4/1971 | Brickner | 420/56 |
| 3,979,186 A | * | 9/1976 | Mizuma | 428/573 |
| 4,669,212 A | | 6/1987 | Jackson et al. | 42/76.02 |
| 5,600,912 A | | 2/1997 | Smith | 42/76.01 |
| 5,815,790 A | * | 9/1998 | Billgren et al. | 419/23 |
| 5,928,799 A | * | 7/1999 | Sherman et al. | 428/655 |

FOREIGN PATENT DOCUMENTS

| | | | | |
|---|---|---|---|---|
| EP | 060053 | * | 9/1982 | |
| EP | 0113651 | * | 7/1984 | |
| EP | 0 339 692 | | 11/1989 | C23C/4/04 |
| EP | 0587489 | * | 3/1994 | |
| JP | 62-70519 | * | 4/1987 | |
| WO | WO 95/19861 | * | 7/1995 | |

OTHER PUBLICATIONS

Derwent Abstract for SU 107933A, published Mar. 1984, one page.*
Derwent Abstract for SU 1652006A, published May–1991, one page.*
Derwent Abstract for SU 1306608A, published Apr. 1987, one page.*
JP 4316831 A (Yoshihara C) Nov. 09, 1992 (Abstract) World Patents Index (online.London, U.K.: Derwent Publications, Ltd. (retrieved on Jun. 05, 2000) Retrieved from: EPO WPI Database. DW 199251, Accession No. 1992–420534 & (No month) JP 4316831 A (Chiharu Yoshihara) Mar. 22, 1993 (Abstract) (online) (retrieved on Jun. 05, 2000) Retrieved from: EPO PAJ Database.

* cited by examiner

Primary Examiner—John J. Zimmerman
(74) Attorney, Agent, or Firm—Michael D. Bednarek; Shaw Pittman LLP

(57) ABSTRACT

Blank for a gun barrel, consisting of a steel bar, which bar, in one or more hot working steps, has been repeatedly wrung about its own longitudinal axis.

7 Claims, 2 Drawing Sheets

BLANK FOR GUN BARREL, METHOD FOR PRODUCING SAID GUN BARREL AND GUN BARREL

TECHNICAL FIELD

The present invention relates to a blank for a gun barrel, which blank consists of a metal bar. The invention further relates to a method for production of a gun barrel, and such a gun barrel. In the concept of gun barrel, there is also included cannon barrels. The invention is applicable for all types of fire-arms, e.g. manual, semi-automatic, or automatic small arms, cannons etc., but has primarily been developed for gun barrels for shot-guns.

STATE OF THE ART AND PROBLEMS

Known gun barrels, e.g. for rifles, shot-guns, automatic or semi-automatic guns, cannons etc., are usually manufactured from a blank which consists of a rolled or forged bar material of steel, which bar material is drilled for the formation of a bore.

One important aspect in connection with the manufacturing of gun barrels is the strength, especially when the gun is fired. Thereby, the gun barrel must be provided with an adequate wall thickness in order to withstand the tensile stresses which occur at the firing of a given charge. The required wall thickness may result in a heavy weapon, which accordingly will be expensive and/or difficult to handle.

One drawback of known gun barrels is that they are manufactured from a bar material which after rolling/forging exhibits its best mechanical properties in the longitudinal direction of the bar. Normally, the fatigue strength, the notch value and the ductility is 20–50% higher in the longitudinal direction than in the lateral direction. This is mainly due to the orientation and the indication of fracture effect of non-metallic occlusions. When the bar material is produced, it is substantially elongated in the longitudinal direction, whereby the occlusions too are being elongated in the same direction. Thereby, the occlusions will exhibit a surface which is substantially larger in the lateral direction as compared to the longitudinal direction, whereby the fatigue strength, the notch value and the ductility will be lower in the lateral direction as compared to the longitudinal direction.

At the use of a gun barrel, i.e. at the firing of the gun barrel, tensile stresses will occur in the barrel due to the internal overpressure, which may be in the magnitude of 3500 bar, which arises in the barrel. Thereby, the stress distribution will principally be the same as in a cylindrical pressure vessel, the difference being that stresses in the longitudinal direction are taken by the gun bolt and by the bullet or the shots. In the barrel itself, no substantial stresses will arise in the longitudinal direction, but in the tangential direction around the barrel, the tensile stresses will on the other hand be large. Therefore, it is a major disadvantage of known gun barrels that they exhibit poorer mechanical properties in the lateral/tangential direction, than in the longitudinal direction.

The problem is accentuated by there being a strive in the technical field to be able to increase the charging in the fire-arms, at the same time as a decreased weight is desired.

Another drawback, which relates to known gun barrels for shot-guns, is that the known gun barrels exhibit far to poor wear resistance or hardness in the bore, considering the decision in certain countries to change from lead shots to iron shots, for certain types of hunting.

ACCOUNT OF THE INVENTION

The above problems are decreased by choosing a blank for the gun barrel according to the present invention.

The invention is based on the understanding of the above problems and on the solution, which is characterized in that a steel bar is repeatedly wrung about its own longitudinal axis, suitably in one or more hot working steps. After heat treatment, the wrung bar constitutes a blank for a gun barrel and may accordingly be drilled or battered, for the making of a bore, and may optionally be post-treated.

According to one aspect of the invention, the bar is wrung about its own longitudinal axis to a helix angel/pitch angle of 45–90°, preferably 60–88° and even more preferred 75–87°. The wringing may be automatically or manually done. By the wringing according to the invention, the occlusions will be crushed into more but smaller disturbances. The occlusions, which before the wringing are mainly oriented in the longitudinal direction of the bar, will moreover instead be mainly oriented tangentially around the bar, mainly at its periphery. Thereby, the occlusions will not constitute as severe indications of fracture at the tangential tensile stresses which arise in connection with the firing of the gun barrel which is manufactured from the bar, as compared to when they are oriented in the longitudinal direction of the bar. The toughness and the fatigue limit of the bar is accordingly increased in the tangential or lateral direction when the bar is wrung according to the invention. The fact that the orientation of the occlusions will become the most tangential in the periphery is advantageous, since the tensile stresses are the largest here.

According to another aspect of the invention, the ultimate breaking strength of the bar may be increased, after the wringing according to the invention, by about 1–5%, the ductility (area contraction) may be increased by about 20–550%, the notch value may be increased by about 20–300% and the fatigue strength may be increased by about 30–50%, these values relating to the increase in the lateral direction and to conventional heat treatment steels for shot-gun barrels.

The ultimate breaking strength and yield strength may be additionally affected by heat treatment after the wringing. An increased possibility to heat treat the steel to an increased hardness and strength, without the material showing tendencies of becoming brittle, is created since the wringing results in an improved toughness. As an alternative, a harder and stronger alloy may be chosen. Such an increase in strength will result in an improved wear resistance and may therefore also be used for saving weight in connection with a decreased wall thickness in the gun barrels as produced.

Furthermore, it is generally true that the steel will become tougher and stronger the larger the degree of processing. By the wringing according to the invention, the degree of plastic machining may be increased without affecting the dimensions of the bar. The machining direction is also taking place in the most advantageous direction, i.e. in the direction in which the largest loads will arise at the use of the weapon.

According to one aspect of the invention, the wringing is performed in two or more hot working steps, the material being allowed to recover between these steps, in order for re-crystallisation to take place. As an alternative, the wringing may be performed in a single step, if it is done slowly. The purpose of performing the wringing in several steps, or to perform it slowly in a single step, is to avoid local overheating, which otherwise may arise in certain cases when the wringing is fulfilled in a single, fast step. Such local overheating may cause surface defections in the bar, which at continued wringing may grow to surface fissures. At a continued wringing, the fissures will grow even more, whereby the bar will be wrung off. The critical limit for the forming of surface defections vary between different steel grades.

By use of the invention, there is created a possibility to increase the charge of a fire-arm and/or to lower the weight of the weapon, as the gun barrel may be provided with a smaller wall thickness as compared to known gun barrels.

Any steel or steel alloy suitable for gun barrels may be used as raw material in the bar. From an strength point of view it is especially advantageous to use a powder metallurgical alloy, preferably a fast solidified powder metallurgical alloy. These types of alloys are common today in qualified metal machining tools, due to their superior strength.

Powder metallurgy will beneficially also give an opportunity to achieve compound materials which are suitable for the purpose. As a material for the part which is to form the inside of the bore in the gun barrel, there may accordingly be chosen a hard and wear resistant material with a large resistance to the friction from the projectiles, but which also provides a good corrosion resistance against gunpowder gases, gunpowder splashes and moisture which may contain dissolved gases and gunpowder splashes. As a material intended to form.the outside of the barrel, there is instead preferably chosen a material of great toughness and strength.

According to yet another aspect of the invention, the gun barrel may be provided with a very decorative surface pattern, at the same time as beneficial properties are achieved in the steel material, by use of so called damascene technique, based on powder metallurgy. Such a powder metallurgical damascene technique, which is especially preferred, is described in Swedish patent SE-C-9400127-8.

In powder metallurgical damascene technique, there is used at least two different steel materials exhibiting substantially differing alloy compositions, e.g. two substantially different types of stainless steel, at least one of them consisting of a powder. The two steel material are united to a consolidated body e.g. by hot isostatic pressing, so called HIP-ing, at a pressure which exceeds 600 bar and a temperature exceeding 1000° C. Other conceivable consolidation techniques are extruding and step-by-step forging of powder in a capsule. Suitably, there is used a powder which is manufactured by so called atomisation, which means that a stream of molten metal is disintegrated into small droplets by the aid of an inert gas, whereafter the droplets are allowed to solidify to a powder in the inert gas. Thereafter, the powder is sieved into a particle size of 1 mm at the most. The HIP-ing may be performed by conventional hot isostatic pressing, the two steel materials to be united with each other, at least one of them being a powder, are arranged in a closed capsule, which is evacuated of air and exposed to the hot isostatic pressing. The capsule may, as is conventional in connection with powder metallurgy, consist of plate, e.g. carbon steel plate, but it may also be conceived that the capsule at least partly consists of stainless steel, which will form an integrated part of the final product. Also, capsules of non-metallic materials may be conceived, e.g. glass, enamel etc.

A conceivable process line is the manufacturing of powder by so called atomisation, filling of two or more powder grades, preferably in prechosen patterns, in a capsule, preferably a steel capsule, compacting to full density by hot isostatic pressing, extrusion or forging of the consolidated body and thereafter continued plastic machining into a bar, wringing according to the invention in a hot working step, and etching in acid in order to develop the decorative effect.

In order to achieve a decorative effect, steel material are chosen of compositions different enough to achieve a desired contrast effect after etching. For example, if both materials are stainless, one of the stainless steels may consist of a martensite, relatively highly carbonised stainless steel, which has limited corrosion resistance and which accordingly is easily etched and darkened by acid, while the other stainless steel suitably consists of a more corrosion resistant, low carbonised stainless steel, which is less etched than the martensite, highly carbonised stainless steel, e.g. an austenite, ferrite or ferrite-austenite stainless steel, or possibly a martensite stainless steel having a substantially lower content of carbon than the first mentioned stainless steel. In principle, according to the invention there may also be used two stainless steel qualities of the same type, e.g. martensite, and which have the same composition with the exception that one of the steels but not the other is alloyed with one or more substances, or contains a substantially larger amount of this or these substances, e.g. phosphor, which results in this steel being substantially more etched than the other steel, all in the cause of achieving a desired contrast effect.

According to one aspect, the different steel materials may be arranged in layers, e.g. as is described in SE-C-9400127-8. Thereby, it is especially preferred to, as in the above described compound technique, arrange a wear resistant or hard steel material as a homogeneous core along the longitudinal axis of the bar, and layers of two or more steel materials outside of this core, which outer steel materials in the main exhibit strength. It is also conceivable to arrange the layers of the different steel materials as more or less concentric rings. Furthermore, the different steel materials may be arranged in relation to each other so that one or more steel materials constitute strands or other areas in another steel material. The different steel materials may be chosen in order to, for each use, give the desired properties consisting of strength, wear resistance, hardness, toughness etc., in different areas of the bar.

In connection with damascene technique, the wringing of the bar which is to constitute a blank for a gun barrel, will result in an additional dimension in the surface pattern of the gun barrel. Accordingly, there may e.g. be made gun barrels with a helical surface pattern, or with a combination of a random or chosen pattern and a helical pattern.

DESCRIPTION OF THE DRAWINGS

The improved effect in mechanical properties, which may be obtained, is in the following accounted for as an example with reference in the drawings, of which.

DETAILED DESCRIPTION OF THE INVENTION

Figure 1:
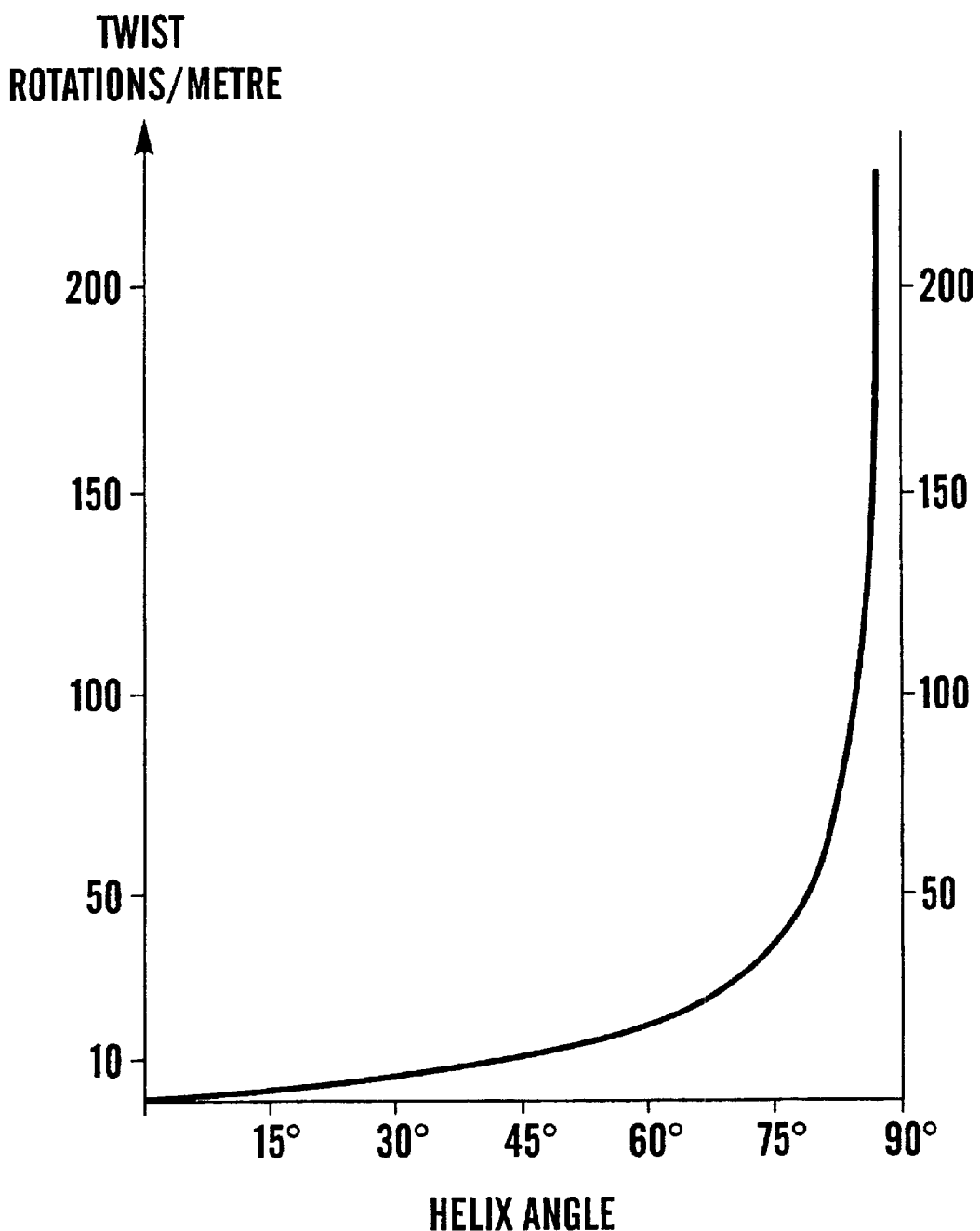
FIG. 1 is showing how many windings a 30 mm round bar must be wrung in order to achieve a given helix angle.
Figure 2:
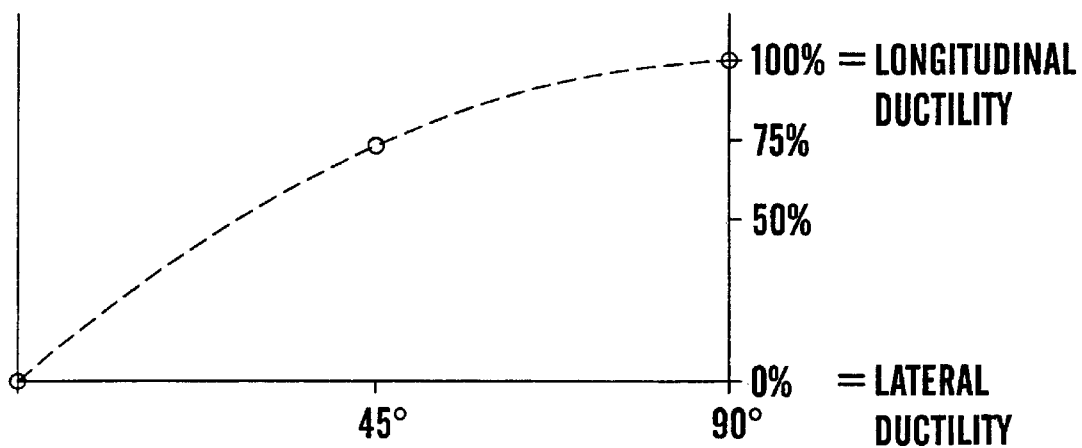
FIG. 2 is showing the increase in ductility in the tangential direction for the bar of FIG. 1.
Figure 3:
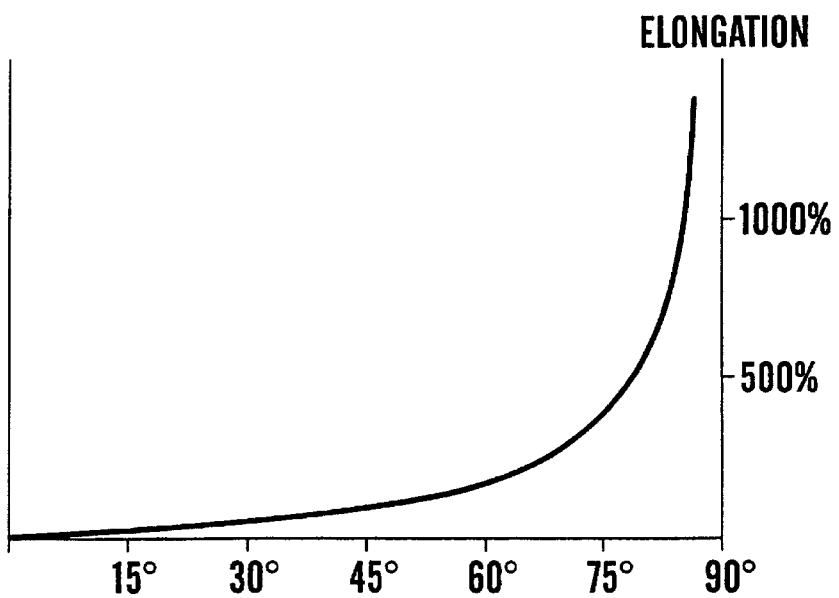
FIG. 3 is showing the degree of processing achieved by the wringing.

The example relates to a 30 mm round bar made of a heat treatment steel which is conventional for shot-gun barrels. In FIG. 1 there is shown how many windings per metre that is required at the wringing in order to achieve a given desired pitch angle/helix angle. FIG. 2 is showing how the ductility increases in the tangential direction as a function of the pitch angle. Other mechanical property parameters are expected to increase in the same way, however in different degrees according to the above. In FIG. 3 there is shown the processing degree, measured as the tangential elongation percentage in the periphery of the bar, which is achieved upon wringing, as a function of the pitch angle. This increased processing degree results in an additional elongation of the occlusions, and thereby additionally improved mechanical properties.

FIG. 2 and 3 are showing that a great deal of the elongation and the improvement in mechanical properties are achieved already at a pitch angle of 45°, but that an additionally increased pitch angle will give even better results. At up to 85° pitch angle, the material has been elongated by as much as 1000% in the periphery. This will mean that, in a 30 mm bar which has been wrung to up to 85% according to the invention, the mechanical properties in the direction of the helix will correspond to the properties in the longitudinal direction of a 10 mm bar.

The invention is not limited to the described embodiments but may be varied within the scope of the claims.

What is claimed is:

1. A method for producing a gun barrel, comprising:

providing a steel bar;

wringing the steel bar about its longitudinal axis to a pitch angle of 45–90° in at least two hot working steps while allowing the steel bar to, at least partly, re-crystallize between the hot working steps; and at least one of drilling and battering the steel bar so-processed along its longitudinal axis.

2. The method of claim 1, wherein the pitch angle is 60–88°.

3. The method of claim 1, wherein the pitch angle is 75–87°.

4. A method for producing a gun barrel, comprising:

providing a steel bar;

wringing, in a single hot working step, the steel bar about its longitudinal axis to a pitch angle of 45–90°; and at least one of drilling and battering the steel bar so-processed along its longitudinal axis, wherein the step of wringing is performed sufficiently slowly to avoid local overheating.

5. A gun barrel comprising steel that has been repeatedly wrung about its longitudinal axis in at least one hot working step, the steel having been wrung about its longitudinal axis to a pitch angle of 45–90°, the steel bar further having been produced by powder metallurgy, wherein the steel bar comprises a compound material, a first, mainly wear resistant, steel material being arranged towards a center of the bar, and a second, mainly strong, steel material being arranged towards an area outside of the center of the bar, and the steel bar having been one of (i) allowed to re-crystallize between hot working steps and (ii) precluded from local overheating by performing the at least one hot working step in a sufficiently slow manner.

6. The gun barrel of claim 5, wherein the steel bar is manufactured from at least two steel materials of different chemical composition, of which at least one consists of a powder, which steel materials have been treated to form a consolidated body, and wherein the consolidated body has been exposed to plastic machining to form the steel bar, the two steel materials of different chemical composition having been selected such that each can be etched with different etching results, so that the gun barrel comprises a decorative surface pattern, by etching.

7. The gun barrel of claim 6, wherein said second steel material being arranged alternating with a third steel material, whereby at least said second and third steel materials are selected to have chemical compositions that allow each to be etched with different etching results, so that the gun barrel comprises a decorative surface pattern, by etching.

* * * * *